US006183789B1

(12) United States Patent
Nilsson et al.

(10) Patent No.: US 6,183,789 B1
(45) Date of Patent: Feb. 6, 2001

(54) POUCH MEAL AND METHOD OF PREPARING SAME

(75) Inventors: Göran Nilsson, Angelholm; Elisabeth Sjöberg, Lund, both of (SE)

(73) Assignee: Nestec S.A., Vevey (CH)

( * ) Notice: Under 35 U.S.C. 154(b), the term of this patent shall be extended for 0 days.

(21) Appl. No.: 09/307,142

(22) Filed: May 7, 1999

(30) Foreign Application Priority Data

May 8, 1998 (GB) .................................................. 9809919

(51) Int. Cl.⁷ ........................... B65D 33/01; B65D 81/34
(52) U.S. Cl. ........................ 426/113; 426/114; 426/412; 426/118; 426/107
(58) Field of Search .................. 426/403, 412, 426/234, 113, 118, 107, 114

(56) References Cited

U.S. PATENT DOCUMENTS

| 3,012,895 | 2/1961 | Stelnicki | 99/192 |
| 3,235,390 | * 2/1966 | Vischer, Jr. | 426/113 |
| 4,861,957 | 8/1989 | Welles | 219/10.55 |
| 4,961,944 | 10/1990 | Matoba et al. | 426/107 |
| 5,376,392 | * 12/1994 | Ikegami et al. | 426/127 |

FOREIGN PATENT DOCUMENTS

| 0 198 362 | 10/1986 | (EP) | 229/902 |
| 0 531 176 | 3/1993 | (EP) | 99/359 |
| 2 483 190 | 5/1980 | (FR) | . |
| 2 251 420 | 7/1992 | (GB) | . |
| 59-017970 | 1/1984 | (JP) | 426/113 |
| 61-187760 | 8/1986 | (JP) | 426/384 |
| 09124005 | 5/1997 | (JP) | . |
| 10042800 | 2/1998 | (JP) | . |

* cited by examiner

Primary Examiner—Gabrielle Brouillette
Assistant Examiner—Robert Madsen
(74) Attorney, Agent, or Firm—Pennie & Edmonds LLP

(57) ABSTRACT

The invention relates to a steamable pouch meal for preparation, e.g., in a microwave oven. The pouch meal comprises i) a plurality of frozen food pieces comprising at least two different types of food and, optionally, a quantity of frozen sauce or liquid seasoning, and ii) a pouch containing the frozen food pieces, the pouch at least partially comprised of a mesh material, the mesh material adapted to permit a first portion of steam produced upon heating the pouch and its contents to escape from the pouch while maintaining a second portion of steam within the pouch to create a steam environment therein for heating the food pieces. The mesh material additionally serves to retain sauce or liquid seasoning and juice from the food pieces within the pouch.

15 Claims, 1 Drawing Sheet

POUCH MEAL AND METHOD OF PREPARING SAME

FIELD OF THE INVENTION

The invention relates to a frozen food product stored and cooked in a steamable pouch. The invention also relates to a method of preparing the frozen food product within the pouch.

BACKGROUND OF THE INVENTION

Preparing food products in a pouch is generally desirable as it permits the food product to be hygienically handled without direct contact with the food and because it typically reduces or eliminates the need for cleaning cooking utensils.

It is known, for example, to boil rice or pasta in net pouches. In so doing, the net pouch with the rice or pasta is immersed into boiling water and, after the food is cooked, the pouch is lifted out of the water. The pouch then acts as its own colander in that the water drains from the food and out of the pouch through the spaces in the net.

Such net pouches are not typically used for other types of food, however, because cooking a food product such as, e.g., vegetables or fish directly in water can result in loss of vitamins and color from the food. The uptake of water results in a change in the structure of the product as well as in the product's taste.

It is also known to prepare meals in a boil-in-bag. A boil-in-bag is a closed pouch which prevents contact between the food contained therein and the water with the attendant loss of vitamins and color as described above. Furthermore, boil-in-bag meals are often previously prepared cooked dishes in sauce which makes them unsuitable for being placed directly into water without any protective package. Such bags are very difficult to handle after boiling, however, as all of the heat imparted due to the boiling is retained within the bag and may cause burns or other injury to the consumer when the bag is opened to access the food.

There has thus been a long-felt need for an article and method for heating, e.g., by steaming, frozen food products without encountering the drawbacks inherent in the prior art. This need is well satisfied by the present invention as described herein.

SUMMARY OF THE INVENTION

Use of the pouch meal of the present invention enables one to provide a high quality hot meal while preserving the vitamin content, flavor, color and taste of the ingredients contained within the pouch. A further object of the invention is the provision of such a meal which can be prepared in a hygienic, safe and convenient manner and which requires as little as possible involvement by the consumer during its preparation. The invention has as an additional object the provision of a meal which is suitable for catering or restaurant outlets.

Accordingly, in a first embodiment, the invention relates to a steamable pouch meal comprising (i) a plurality of pieces of at least two different types of frozen food, and
(ii) a steamable pouch containing the frozen food pieces, the pouch at least partially comprised of a mesh material wherein the mesh is adapted to permit a first portion of steam produced upon heating the pouch to escape while retaining a second portion of steam within the pouch to maintain a steam environment therein, thus heating the food contained within the pouch.

It has been found that upon heating the pouch in, for example, a microwave oven, the mesh makes it possible to generate a steam environment within the pouch while permitting sufficient steam to escape to prevent injury to the consumer upon opening the pouch to access the meal contained therein. It has also been found that, with the pouch of the invention, the steam which condenses on the inside of the pouch and moisture generated from the heating of the food are retained in the pouch. Thus when heating the frozen product in the pouch in the microwave oven, the food is steamed and a crispy product is obtained which has a high level of vitamins and a well-preserved color.

In another embodiment, the invention relates to a method of preparing a frozen food product in a steamable pouch as described herein wherein the steamable pouch containing the food is heated in a microwave oven.

In a further embodiment, the invention relates to a method of preparing a frozen food product in the steamable pouch as discussed above wherein the steamable pouch is heated in a steam cooker.

The method of food preparation described herein is believed to be an improvement over preparing such a meal by conventional steam cooking, i.e., wherein the food is not packaged for heating within the pouch of the invention. In a conventional steam cooker all steam and moisture which results from the heating of the product will evaporate or drip from the product. In contrast, when the food is heated within the mesh pouch produced in accordance with the present invention, moisture from the food and any sauce which may have been applied thereto is retained in the pouch while a portion of the steam thus produced is allowed to escape through the mesh. This arrangement ensures that an amount of steam sufficient for heating the food remains in contact therewith while excess steam is dissipated out of the package to prevent overheating or injury upon opening of the pouch. Furthermore, sauce or liquid seasoning may be included with the food pieces without being lost during the process.

In addition, the quality of the product which is obtained when heating the pouch meal according to the invention is different from the quality obtained had the product been prepared in a roasting bag in a microwave oven. A roasting bag is an impervious bag which normally is provided with several perforations to prevent it from exploding when the product is heated. Use of such a roasting bag results in pressure cooking and braising of the product. The taste of the product prepared in a roasting bag is therefore different from that achieved with the present invention due to the cooking, boiling and braising of the ingredients together which takes place in the roasting bag. The product heated in the mesh pouch of the invention, however, will be steamed, not boiled, in a moist environment.

BRIEF DESCRIPTION OF THE DRAWINGS

The invention will now be described in further detail with reference to the drawings and examples, in which.

DETAILED DESCRIPTION OF THE PREFERRED EMBODIMENTS

Figure 1:
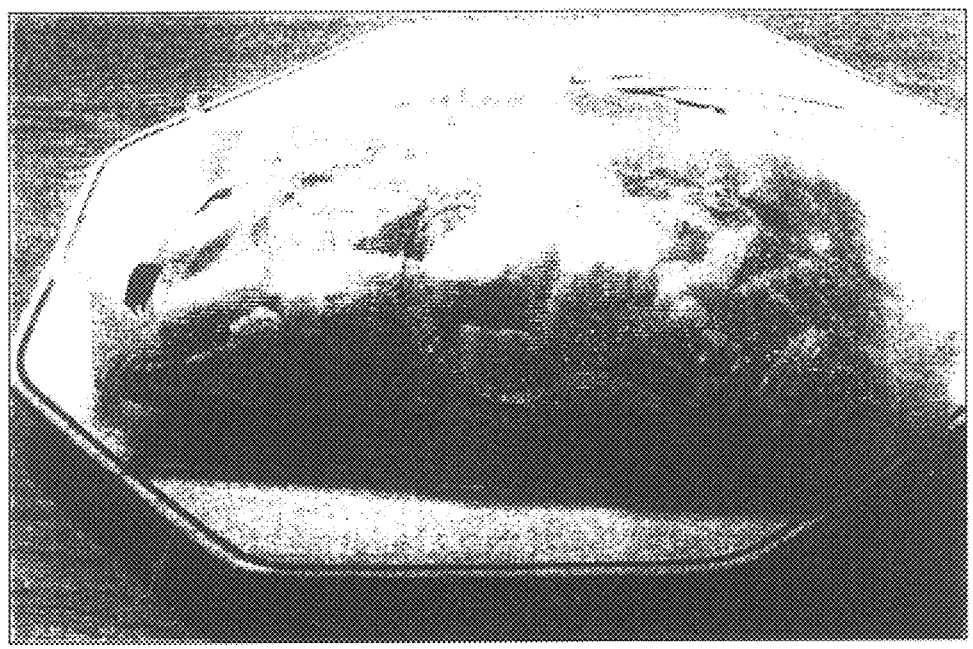
FIG. 1 shows a photograph of a frozen pouch meal in accordance with the invention.

In the pouch meal of the invention, the frozen food product comprises at least two types of frozen food pieces which may, for example, be individually frozen. As the frozen product can comprise a variety of different foods, a complete meal can be stored and prepared in the pouch of the invention.

It has surprisingly been found that a meal with a sauce or liquid seasoning may also be prepared in the mesh pouch produced in accordance with the invention. That is, the frozen food pieces and sauce or liquid seasoning may be packed together in the pouch for storage, transport and subsequent heating. When heating the pouch in a microwave oven, it has been found that the sauce or liquid seasoning will substantially remain in the pouch. The mesh pouch of the invention may retain liquid having a Bostwick viscosity in the range of from about 1 to about 20 cm/30 seconds (test conditions: 50 ml sauce or liquid seasoning, 20° C., 30 sec flow time). Preferred mesh materials for this purpose are described below.

The food pieces may be coated with the sauce or liquid seasoning by, for example spraying the material onto the food pieces. Alternatively, the sauce or liquid seasoning may be included in the pouch in the form of frozen pellets.

It has been found that by utilising a mesh material having 80 to 100 holes per cm$^2$ the above discussed steaming of the food pieces may be obtained and sauce or liquid seasoning retained in the pouch. It is preferred that the mesh has a hole size of less than about 500 microns. More preferably the hole size is from about 425 to about 475 microns. The most preferred hole size is about 450 microns. If desired, only a portion of the pouch may be formed of mesh material or, alternatively, the entire pouch may be formed of the mesh material.

Suitable materials for the mesh are materials which are substantially transparent to microwave, and which can withstand heating of the product. The mesh is preferably formed of a plastic material such as polyethylene, polypropylene, polyester, etc. More preferably, the mesh is formed of high-density polyethylene (HDPE). The mesh advantageously has a thickness of below about 200 microns, more preferably below about 100 microns.

The food pieces may be selected from the group consisting of individually frozen predominantly meat ingredients, individually frozen predominantly carbohydrate ingredients, and individually frozen predominantly vegetable based ingredients or a combination thereof.

Preferably, the individually frozen predominantly meat based ingredients comprise, e.g. meat, poultry, fish meat, seafood or other types of meat. The size of the ingredients ranges from about 1 to about 50 grams, preferably from about 1 to about 20 grams. The size of the ingredients determine the preparation time required. Therefore, it is desirable to have relatively small pieces.

The individually frozen predominantly carbohydrate ingredients preferably include ingredients such as rice, pasta, potato, etc.

The individually frozen predominantly vegetable ingredient preferably comprises carrot, peas, peppers, beans, wheat corns. If desired, the vegetables may be blanched to enhance the safety of the food.

The food pieces may be whole or cut into smaller portions. For example, the meal may comprise whole potatoes or, e.g., potato slices.

The ingredients may be pre-cooked or edible upon thawing. For ingredients, which require little cooking, such as fish meat or seafood, it may not be necessary to pre-cook.

The invention has been found to be particularly useful for the preparation of meals of fish or other seafood. For example meals of fish and/or other seafood and vegetables have been successfully prepared. The meal may be prepared with or without sauce or liquid seasoning.

In the present context a liquid seasoning is, e.g., a liquid medium comprising seasoning and fat. For example, the liquid seasoning may include water, herbs or spices, starch and oil.

In one embodiment of the invention a sauce is, e.g., selected from the group consisting of cheese sauce and béchamel sauce with or without milk, tomato sauce and vegetable sauce, or some combination thereof. The sauce may or may not comprise pieces of meat, fish or vegetables etc. Other sauces are sauces based on meat or fish stock or gravy.

The sauce or liquid seasoning preferably has a Bostwick viscosity in the range of from about 1 to about 20 cm/30 seconds (test conditions, 50 ml sauce or liquid seasoning, 20° C., 30 sec flow time).

The sauce or liquid seasoning has a water content of from about 75 to about 98% by weight, preferably from about 75 to about 95%, advantageously about 90% wt. It is preferred that the sauce constitutes from about 5 to about 15% of the total weight of the meal.

If the sauce or liquid seasoning is in pellet form, each pellet preferably weighs from about 1 to about 10 grams.

The fact that the ingredients may be individually frozen makes it possible to vary the composition of the meal on a production line for preparing such pouch meals.

The considerations regarding the preferred composition of the meal as discussed above, are also applicable to the method of the invention. Preferred preparation conditions are discussed below in the example, which is provided for illustrative purposes only and which does not limit the invention in any manner.

EXAMPLE

A representative pouch meal prepared in accordance with the invention may include the following ingredients:

| | |
|---|---|
| Mixed vegetables | 100–325 g |
| Shrimps-Chicken-Fish | 35–100 g |
| Pasta-Rice | 50–150 g |
| liquid spice | 10–35 g |
| Total weight | about 350 g |
| Liquid seasoning: | |
| vegetable oil | 0–15 g |
| boullion/stock | 5–15 g |
| modified starch | 2–4 g |
| water | 15–20 g |
| salt, herbs and spices | 1–3 g |
| Total weight | 10–35 g |

A frozen pouch meal comprising food pieces as indicated above is shown in FIG. 1.

Cooking was performed in a microwave oven (700W). A desirable minimum temperature of the meal ingredients is about 75° C. The pouch was heated until the coldest portion of the food reaches this temperature. In so doing, the pouch was placed in the microwave oven and heated for 4 to 5 minutes. The pouch was inspected during heating through a window in the microwave oven. Steam escaped from the pouch through the mesh during cooking and a slight lifting of the pouch material took place but the pouch did not burst.

Figure 2:
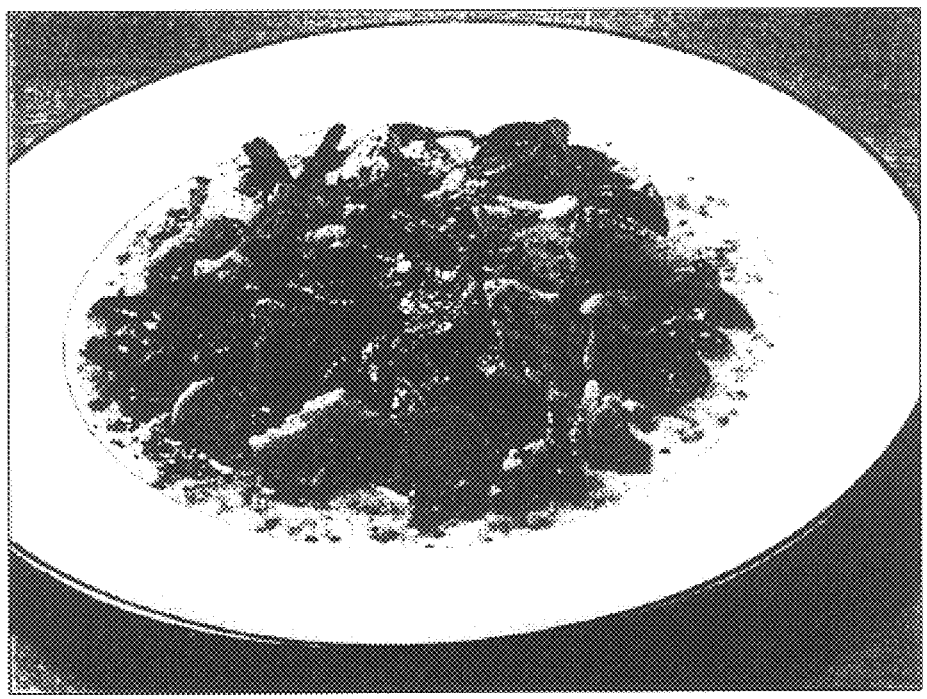
FIG. 2 shows a photograph of the meal of FIG. 1 following its heating within the pouch.

The pouch was removed from the microwave oven and the contents arranged on a plate as shown in FIG. 2. The product was evaluated and the ingredients were found to be fresh in color, having a pleasant crisp texture and serving as a complete meal, providing an impression of freshness and healthy eating. An amount of juice or sauce may be present if desired, depending upon the amount of spice added in liquid form. The pouch prevents the products from dehydrating and the sauce, liquid seasoning or juice from evaporating during reconstitution in the microwave oven.

What is claimed is:

1. A steamable pouch meal comprising:
   (i) a plurality of pieces of frozen food, wherein said frozen food includes at least two different foods and a frozen liquid; and
   (ii) a steamable pouch having inner and outer surfaces and containing the frozen food pieces therein, with at least a portion of both the inner and outer surfaces of the pouch being made of a mesh material having hole sizes of at least about 425 microns but less than about 500 microns and a hole distribution ranging from 80 to 100 holes per square centimeter to both:
      (a) permit a first portion of steam produced upon heating said pouch and its contents to escape from the pouch while maintaining a second portion of steam within said pouch to create a steam environment therein for heating said food pieces; and
      (b) retain said liquid within the pouch upon heating.

2. A pouch meal according to claim 1, wherein the mesh material is adapted to retain liquid within said pouch having a viscosity in the range of from about 1 to about 20 Bostwick Centigrades.

3. A pouch meal according to claim 1, wherein said pouch further contains at least one frozen pellet of sauce or liquid seasoning.

4. A pouch meal according to claim 1, wherein the food pieces are coated in sauce or liquid seasoning.

5. A pouch meal according to claim 1 wherein the hole sizes of the mesh range from about 425 microns to about 475 microns.

6. A pouch meal according to claim 1, wherein the pouch is entirely formed of a mesh material.

7. A pouch meal according to claim 1, wherein the food is selected from the group consisting of individually frozen predominantly carbohydrate ingredients, individually frozen predominantly vegetable ingredients, individually frozen predominantly meat based ingredients and combinations thereof.

8. A pouch meal according to claim 1, wherein the food pieces comprises fish and/or seafood and vegetables.

9. A method of preparing a pouch meal according to claim 1, wherein the steamable pouch is heated in a microwave oven.

10. A method of preparing a pouch meal according to claim 1, wherein the steamable pouch is heated in a steam cooker.

11. A steamable pouch meal comprising
    (i) a plurality of pieces of frozen food, wherein said frozen food includes at least two different foods and a frozen liquid; and
    (ii) a steamable pouch having inner and outer surfaces and containing the frozen food pieces therein, said pouch being made of a mesh material that forms both the inner and outer surfaces of the pouch; wherein the mesh material has hole sizes of at least about 425 microns but less than about 500 microns and a hole distribution ranging from 80 to 100 holes per square centimeter to both:
       (a) permit a first portion of steam produced upon heating said pouch and its contents to escape from the pouch while maintaining a second portion of steam within said pouch to create a steam environment therein for heating said food pieces; and
       (b) retain said liquid within the pouch upon heating.

12. A pouch meal according to claim 11 wherein the hole sizes of the mesh range from about 425 microns in diameter to about 475 microns in diameter.

13. A pouch meal according to claim 11 wherein the pouch is made of single uncoated, uncovered, layer of mesh material having hole sizes of about 425 microns in diameter to about 475 microns in diameter.

14. A pouch meal according to claim 11 wherein the mesh thickness is less than about 200 microns.

15. A pouch meal according to claim 11 wherein the entire pouch is made of mesh material having a thickness of less than about 100 microns.

* * * * *